US009288212B2

United States Patent
Armbruster et al.

(10) Patent No.: US 9,288,212 B2
(45) Date of Patent: Mar. 15, 2016

(54) METHOD FOR PROCESSING A NETWORK SERVICE REQUEST IN WHICH A FILE WITH AUTHORIZATION INFORMATION IS MAINTAINED WITH A NETWORK ELEMENT LOCATED LOGICALLY CLOSEST TO THE USER REQUESTING THE NETWORK SERVICE

(75) Inventors: Friedrich Armbruster, München (DE); Thomas Treyer, München (DE)

(73) Assignee: Adtran GmbH, Berlin-Siemensstadt (DE)

( * ) Notice: Subject to any disclaimer, the term of this patent is extended or adjusted under 35 U.S.C. 154(b) by 1973 days.

(21) Appl. No.: 12/515,544

(22) PCT Filed: Oct. 31, 2007

(86) PCT No.: PCT/EP2007/009488
§ 371 (c)(1),
(2), (4) Date: May 20, 2009

(87) PCT Pub. No.: WO2008/061613
PCT Pub. Date: May 29, 2008

(65) Prior Publication Data
US 2010/0057925 A1    Mar. 4, 2010

(30) Foreign Application Priority Data
Nov. 23, 2006 (DE) .......................... 10 2006 055 684

(51) Int. Cl.
G06F 13/00 (2006.01)
H04L 29/06 (2006.01)
H04L 12/18 (2006.01)

(52) U.S. Cl.
CPC ............ H04L 63/102 (2013.01); H04L 12/185 (2013.01); H04L 63/20 (2013.01)

(58) Field of Classification Search
USPC .......................................................... 709/229
See application file for complete search history.

(56) References Cited

U.S. PATENT DOCUMENTS

| 6,832,256 | B1 | 12/2004 | Toga |
| 7,451,149 | B2 | 11/2008 | Lee et al. |
| 2002/0053023 | A1 | 5/2002 | Patterson et al. |
| 2007/0136476 | A1* | 6/2007 | Rubinstein .................... 709/227 |
| 2007/0253409 | A1 | 11/2007 | Fu et al. |
| 2008/0289008 | A1 | 11/2008 | Bourdon et al. |

FOREIGN PATENT DOCUMENTS

| EP | 1715628 A1 | 10/2006 |
| WO | 2005048526 A1 | 5/2005 |
| WO | 2006087472 A1 | 8/2006 |

OTHER PUBLICATIONS

Hayashi et al: Internet Group membership Authentication Protocol (IGAP) <draft-hayashi-igap-03.txt> Internet Draft, Internet Engineering Task Force (IETF), Aug. 1, 2003, XP015001146.
Mitch Tulloch: "Implementing and Troubleshooting Account Lockout" [Online], Aug. 31, 2004, XP007904719 Retrieved from the Internet: URL:http://www.windowsecurity.com/articles/Implementing-Troubleshooting-Account-Lock out.html>.

* cited by examiner

*Primary Examiner* — Robert B Harrell
(74) *Attorney, Agent, or Firm* — Laurence A. Greenberg; Werner H. Stemer; Ralph E. Locher

(57) ABSTRACT

In a method for processing a network service request, a first network element that is logically closest to a user requesting the network service manages a file into which data can be entered in respect of a user authorization to receive the network service. A network element includes a device for allowing and blocking transmission of a network service to a user requesting the network service. The device can be switched in accordance with the authorization data contained in the data memory.

13 Claims, 1 Drawing Sheet

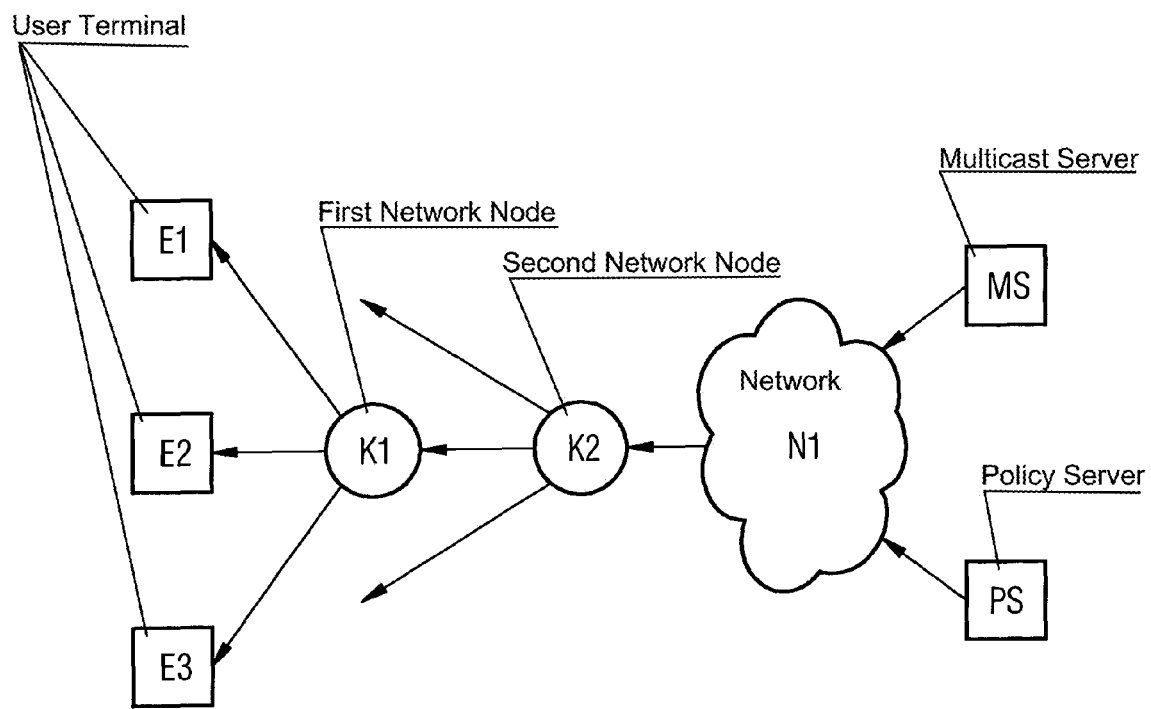

METHOD FOR PROCESSING A NETWORK SERVICE REQUEST IN WHICH A FILE WITH AUTHORIZATION INFORMATION IS MAINTAINED WITH A NETWORK ELEMENT LOCATED LOGICALLY CLOSEST TO THE USER REQUESTING THE NETWORK SERVICE

BACKGROUND OF THE INVENTION

Field of the Invention

A method is described for processing a request for a network service, as well as a network element which has means for processing the request.

The so-called multitask technique is being increasingly used for distribution of audio and video streams, and for distribution of data via packet-based networks. This allows data to be transmitted only once via connections, even though a plurality of users request or receive the data at the same time.

BRIEF SUMMARY OF THE INVENTION

One problem to be solved is to specify a method and means on the basis of which network services can be transmitted and processed using minimal network capacities.

A method is specified in which a first network element, which is located logically closest to a user requesting the network service, maintains a file in which information can be entered relating to the authorization of the user to receive the network service.

This is advantageously achieved in that, on the basis of the information which has already been entered in the file, the first network element need not check a further network element possibly via a plurality of other network elements, for authorization information on each new request of a user to use that network service. This makes it possible to check the file, which exists in the first network element, for authorization information relating to the user just once for each user who once again requests one and the same network service. This therefore makes it possible to considerably reduce the utilization of network capacities for administration of a network service for one user or for a plurality of users.

The invention provides for the network service to be transmitted from the first network element to the user when a user is authorized to receive the network service. In this case, the transmission can be sent to a user terminal which, for example, in addition to permanently connected appliances such as a computer, a television, a decoder or a video games console, may also be a mobile terminal such as a laptop computer or a mobile telephone line.

According to one embodiment of the method, an IGMP protocol is used for communication between the first network element and the further network element.

The further network element may comprise a policy server which has information relating to the authorization of a user to receive the network service. The policy server may be a component of the network or may belong to a network which a provider of the requested network service uses or operates.

According to one advantageous embodiment of the method, the information which is entered in the file may comprise an indication, which can be interpreted for the first network element, of the duration for which the user has the authorization to receive the network service. In this case, it may be sufficient for a requested network service for this information to be checked only once by a further network element, for example the policy server. The first network element can then continue to transmit the network service to the user until the authorization duration of this network service has elapsed.

If a user is not authorized to receive the network service, one embodiment provides for no entry whatsoever to be made in the file.

According to one embodiment of the method, a remaining authorization duration for the user to receive a requested network service is entered in the file. An indication relating to the remaining authorization duration can be checked repeatedly by the first network element, from a further network element which has this information. In this case, the information which can be checked from the further network element may also comprise an indication that no further checks will be required in the future until a specific point in time.

One embodiment of the method provides that the further network element sends authorization information autonomously and without being requested to the first network element, that is to say without any check from the first network element being carried out. This is also an advantageous further measure to reduce the utilization of network capacities.

It is advantageous for the first network element to maintain a separate file for each user who requests a network service. This therefore makes it possible to efficiently process requests for network services from a plurality of users who are connected to a common first network element. The first network element may be in the form of a network node. In particular, these may be network switches having a plurality of network interfaces or ports.

According to one embodiment, the network service requested by a user comprises a multicast stream. In particular, the network service may comprise at least one of the following media: Data reproduction in real time, video, streaming video, audio, streaming audio, television, satellite television. According to one embodiment, the method is used for the transmission and/or distribution of television programs or for the transmission of data such as stock market information.

Authorization durations for users of standard transmitters may be in the region of weeks or months while, for example, a live football match could be enabled only for a period of a few hours.

A multicast stream can be transmitted by a multicast server of a network service provider.

A network element is also specified, having means for processing a network request. The network element comprises a data store in which information relating to the authorization of a user to request a network service can be stored.

Furthermore, the network element has means for enabling and for inhibiting a network service transmission to a user who requests the network service, in which case the means can be switched as a function of the authorization information contained in the data store. According to one embodiment, an appropriate program product can be installed for this purpose in the first network element, which program product controls the transmissions of network services as a function of the data in a file which contains authorization information.

It is preferable for the authorization information relating to a user who requests a network service to be stored in a table.

One or more embodiments provide for at least one of the following network elements to have a wire-free communication interface: the first network element, the further network element and the policy server, a server of a network service provider which transmits a network service and each network element which is switched between the abovementioned network elements or is communicatively connected to one of these network elements. According to the described methods, network services can therefore also advantageously be transmitted in a wire-free manner.

The described subjects will be explained in more detail with reference to the following FIGURE and exemplary embodiments. In the FIGURE:

BRIEF DESCRIPTION OF THE SEVERAL VIEWS OF THE DRAWING

FIG. 1 shows a schematic illustration of a network having a network element which contains a file with authorization information relating to a user who requests a network service.

DESCRIPTION OF THE INVENTION

FIG. 1 shows a first network element K1, for example a multicast replicator, which forms a node or node point in a network and is connected to a plurality of terminals E1 to E3 which are used by users. A further network element K2, likewise forming a network node and comprising a multicast replicator, is connected to the first network element K1. The further network element K2 is connected via a network N1 both to a multicast server MS and to a policy server PS.

The multicast server MS is able to transmit a network service requested by a user via multicast and could belong to a service provider in the Internet. It is proposed that the IGMP or the PIM protocol be used to control a multicast distribution. A protocol such as this allows a node in a network to learn to which connected network element, such as a link, a multicast stream can be replicated when required.

In the case of a node K1, which operates in a layer 2 segment of a network, replication information for a network service can be extracted by means of an IGMP proxy or by means of a snooping method.

The node K1 which, for example, operates in a layer 2 segment and represents the final network element which transmits information or a requested network service requested by a user or user terminal, is allocated a special role. The node is in this case configured to check the authorization of the user to receive a network service. Further nodes K2, which are located logically and/or geographically further away in a network from a user or a terminal E1, E2, E3 used by the user, are preferably not allocated this role since a multicast stream, should in general be intended specifically for various users.

Authorization information which indicates which users are authorized to request the information can now be stored in a file in the node K1, for an authorization check. By way of example, one file form which is suitable for this purpose would be a table. In the case of a network service which makes use of multicast streams, the multicast streams may be marked by means of a multicast identification, for example by means of a multicast MAC (Media Access Control) address or an IP (Internet Protocol) multicast address.

The file which contains authorization information may be configured statically, in which case changes in it can in general each be entered by means of an operating system. Authorization information may in this case be loaded automatically from the policy server PS. For example, according to one embodiment whenever the user requests a network service, the node K1 could check with the policy server PS whether the user has authorization for the requested information.

In addition to the television programs which are distributed by means of multicast streams, programs and services which have to be paid for could advantageously be offered. In these cases, it would be possible for the authorizations to be allocated for only a limited time, for example for a few hours. One example of a program such as this would be a live transmission of a sport, for example a football match or a tournament.

For each connected user or for each connected terminal E1 to E3, the node K1 maintains a file which contains the identification of the network service requested or used by the user, as well as a time $T_f$ which indicates for how long this network service will be enabled. By way of example, the network service is a multicast stream such as a video program or television program. This has the advantage that each configuration or authorization check in the node K1 need not be carried out again, since this would result in a load on the network capacities. In particular, in this case, the protocol load in a network and, for example, on the policy server PS as well, could be considerably reduced.

The table is preferably empty when the node K1 receives a network service request from a user or user terminal E1, E2 or E3 for the first time. When the request for a network service arrives from a user at the node K1, an authorization request is sent to the policy server PS if the table is empty or if there is not yet any entry for this network service. The response from the policy server includes an indication as to whether the user may receive this network service and, if yes, then for what time interval.

If the response from the policy server PS to the request from the node K1 is negative then, first of all, nothing is entered in the table and the network service is not sent to the user.

In contrast, if the response is positive, then the network service is sent to the user or to the user terminal E1, E2 or E3.

If the authorization duration for the user will not elapse until a time in the future, then the enabling of the node K1 is entered in the table, together with the duration of its validity.

If the user once again requests the network service before the authorization duration has elapsed, then it is advantageously sufficient for the node K1 just to check the table and then to send the network service to the user.

In addition, the node K1 monitors whether the time entered in the table has or has not elapsed. When the authorization duration elapses, a distinction is preferably drawn between two possible procedures as follows.

In a first procedure, the user is currently using a network service. Either the node K1 interrupts the transmission of the network service to the user when the authorization time elapses, or it automatically starts a new check with the policy server PS and interrupts the transmission only if the check with the policy server has a negative response. Alternatively, the node K1 interrupts the transmission only after an adjustable response time for the policy server has elapsed.

In the case of a second procedure, the user is no longer receiving the network service at that time. In this case, the original entry relating to the user can first of all be deleted from the table. The check as to whether the user is still authorized to receive the requested network service can instead of this be carried out when this network service is next requested, that is to say for example once the user has at least once interrupted the reception of the network service (he switches off his television) and later requests the same network service again. If the user does not interrupt the use of the network service, then the transmission of the network service is carried out at most until the authorization duration originally entered in the table has elapsed. The table can therefore be updated to the latest standard in a simple manner, with regard to the authorization duration of the user for that network service.

According to one embodiment of a method for processing a request for a network service, the following information is stored in a file in the node K1 for each user:

- identification of the network service, for example a multicast stream. This can be done by means of the entry of a multicast MAC address or an IP multicast address.
- An indication as to whether the authorization duration for the user is relative, that is to say for example the remaining time until the authorization duration elapses, or whether the time is absolute, that is to say for example a specific date DD/MM/YY, and a clock time.

An indication as to whether an authorization for a network service or an inhibit has already been entered in the file, and possibly an indication as to when the authorization will elapse, can optionally additionally be stored in the file.

Furthermore, as mentioned above, the time at which the authorization duration starts can be stated as a relative value or an absolute value.

A check with the policy server preferably includes an identification of the user and the identification of the network service. The response from the policy server includes the data relating to the request as well as data which relates to the authorization duration, in the above manner.

According to one embodiment, a capability is provided in a communication protocol between the node K1 and the policy server PS for the policy server to transmit changes of authorization durations autonomously to the node K1. This on the one hand makes it possible to distribute clearances for a network service before the user requests this network service. On the other hand, clearances and the authorization duration can thus be ended prematurely.

According to a further embodiment, negative findings relating to the authorization for reception of a network service can be provided with a clock time and can be entered in the file. This has the effect that the network service for a user requesting this service is inhibited for the indicated time. This advantageously makes it possible to reduce the number of requests for network services which are not being used at that time.

If it can be foreseen that the response to most requests for specific channels and users will be negative, a further reduction in the request from the policy server can be achieved by the use of the second procedure mentioned above. In the situation in which one channel is used in order to transmit a real-time event or a live event, for example the first request will have a negative response, and a time shortly before the start of the next transmission will be indicated. This allows the node K1 to automatically reject all requests prior to this time, thus reducing the network traffic in connections between the policy server PS and the node.

However, according to another embodiment, each request from a user is passed on by the node K1 to the policy server, but with the response to the request from the policy server being positive with a time "0" or indicating a time in the past. The indicated time means that, although there is still an authorization for the network service at that instant, the policy server must, however, be checked again when the next request is made for the network service.

LIST OF REFERENCE SYMBOLS

E1 to E3 User terminals
K1 First network node
K2 Second network node
N1 Network
MS Multicast server
PS Policy server

The invention claimed is:

1. A method for processing a network service request, which comprises:
   maintaining, with a first network element that is located logically closest to a user requesting a network service, a file for entering therein information relating to an authorization of the user to receive the network service;
   checking, with the first network element, for each user who requests a network service for the first time, a further network element for the information relating to the authorization of the user, and entering the information obtained from the further network element in the file;
   providing any negative findings relating to the authorization for receiving a network service with a clock time and entering into the file, in order to inhibit access to the network service for the indicated clock time for a user requesting the service;
   for each user who once again requests one and the same network service, checking the file for information relating to the authorization of the user; and
   transmitting authorization information from the further network element autonomously and without being requested to the first network element.

2. The method according to claim 1, which comprises, when a user is authorized to receive the network service, the network service is transmitted from the first network element to the user.

3. The method according to claim 2, which comprises entering into the file a remaining authorization duration for the user to receive a requested network service.

4. The method according to claim 1, which comprises employing an IGMP protocol for communication between the first network element and the further network element.

5. The method according to claim 1, wherein the further network element comprises a policy server.

6. The method according to claim 1, in which the information contains an indication, which can be interpreted for the first network element, of the duration for which the user has the authorization to receive the network service.

7. The method according to claim 1, wherein a lack of authorization of a user to receive the network service is not entered in the file.

8. The method according to claim 1, which comprises maintaining a separate file in the first network element containing authorization information for each user who requests a network service.

9. The method according to claim 1, wherein the network service uses a multicast stream.

10. The method according to claim 1, wherein the network service comprises at least one of the following media: data reproduction in real time, video, streaming video, audio, streaming audio, television, and satellite television.

11. The method according to claim 1, wherein the first network element is communicatively connected to a plurality of users.

12. The method according to claim 1, wherein the first network element comprises a first network node.

13. The method according to claim 1, which comprises transmitting the network service by a multicast server.

* * * * *